US011510045B2

(12) United States Patent
Buechter et al.

(10) Patent No.: US 11,510,045 B2
(45) Date of Patent: Nov. 22, 2022

(54) INITIATION AND/OR ROUTING OF AN EMERGENCY SESSION IN A PACKET SWITCHED COMMUNICATION SYSTEM

(71) Applicant: Deutsche Telekom AG, Bonn (DE)

(72) Inventors: Martin Buechter, Troisdorf (DE); Norbert Esseling, Bonn (DE); Reinhard Lauster, St. Poelten (AT)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 17/262,279

(22) PCT Filed: Jul. 25, 2019

(86) PCT No.: PCT/EP2019/070057
§ 371 (c)(1),
(2) Date: Jan. 22, 2021

(87) PCT Pub. No.: WO2020/021017
PCT Pub. Date: Jan. 30, 2020

(65) Prior Publication Data
US 2021/0250747 A1    Aug. 12, 2021

(30) Foreign Application Priority Data

Jul. 27, 2018 (EP) ..................................... 18185941

(51) Int. Cl.
*H04W 4/90* (2018.01)
*H04W 76/50* (2018.01)
(Continued)

(52) U.S. Cl.
CPC ........... *H04W 4/90* (2018.02); *H04L 65/1016* (2013.01); *H04L 65/1063* (2013.01);
(Continued)

(58) Field of Classification Search
CPC ......... H04W 4/12; H04W 4/90; H04W 76/50; H04L 65/1006; H04L 65/1016; H04L 65/1063; H04L 65/1069; H04L 65/1104
See application file for complete search history.

(56) References Cited

U.S. PATENT DOCUMENTS

2010/0003948 A1 * 1/2010 Ray ........................ G10L 13/00
455/466
2012/0244829 A1    9/2012 Jarvenpaa et al.
(Continued)

FOREIGN PATENT DOCUMENTS

CN   107113584 A   8/2017
KR   20090085402 A   8/2009

*Primary Examiner* — Wayne H Cai
(74) *Attorney, Agent, or Firm* — Leydig, Voit & Mayer, Ltd.

(57) ABSTRACT

A method for an enhanced initiation and/or routing of an emergency session in a packet switched communication system includes: determining or defining—by a mobile communication device or by means of the mobile communication device—of personal communication ability information and/or personal medical condition information of a user of the mobile communication device; and initiating the emergency session by using the mobile communication device. Initiating the emergency session comprises transmitting an emergency message, via a packet switched connection of the mobile communication device, to the packet switched communication system. The personal communication ability information and/or the personal medical condition information is part of the emergency message.

20 Claims, 5 Drawing Sheets

20 mobile communication device 100 packet switched communication system
110 packet access entity or node
120 packet access entity or node
130 P-CSCF entity or node
140 E-CSCF entity or node 200 public safety answering point
210 public safety answering point network
220 public safety answering point user equipment or call agent (51) Int. Cl.
*H04L 65/1016* (2022.01)
*H04L 65/1063* (2022.01)
*H04L 65/1069* (2022.01)
*H04W 4/12* (2009.01)
*H04L 65/1104* (2022.01)

(52) U.S. Cl.
CPC ...... *H04L 65/1069* (2013.01); *H04L 65/1104* (2022.05); *H04W 4/12* (2013.01); *H04W 76/50* (2018.02)

(56) References Cited

U.S. PATENT DOCUMENTS

| | | | |
|---|---|---|---|
| 2012/0302201 A1* | 11/2012 | Siomina | H04W 4/029 |
| | | | 455/404.2 |
| 2013/0148549 A1* | 6/2013 | Crawford | H04M 11/04 |
| | | | 370/259 |
| 2014/0270144 A1* | 9/2014 | Bentley | H04M 3/5116 |
| | | | 379/265.12 |
| 2015/0156321 A1 | 6/2015 | Abnett et al. | |
| 2015/0170507 A1 | 6/2015 | Ginter et al. | |
| 2015/0288797 A1* | 10/2015 | Vincent | H04W 4/90 |
| | | | 455/404.2 |
| 2017/0156045 A1 | 6/2017 | Balabhadruni et al. | |
| 2017/0215056 A1* | 7/2017 | Edge | H04W 4/90 |
| 2017/0374538 A1* | 12/2017 | Gellens | H04W 4/90 |
| 2018/0084587 A1* | 3/2018 | Noor | H04L 65/80 |
| 2018/0124584 A1 | 5/2018 | Venkatraman et al. | |
| 2019/0089832 A1* | 3/2019 | Rao | H04L 65/1069 |

\* cited by examiner

Fig. 1

20 mobile communication device 100 packet switched communication system
110 packet access entity or node
120 packet access entity or node
130 P-CSCF entity or node
140 E-CSCF entity or node 200 public safety answering point
210 public safety answering point network
220 public safety answering point user equipment or call agent

Fig. 2

20 mobile communication device 100 packet switched communication system
110 packet access entity or node
120 packet access entity or node
130 P-CSCF entity or node
140 E-CSCF entity or node 200 public safety answering point
210 public safety answering point network
220 public safety answering point user equipment or call agent

Fig. 3

20 mobile communication device 100 packet switched communication system
110 packet access entity or node
120 packet access entity or node
130 P-CSCF entity or node
140 E-CSCF entity or node 200 public safety answering point
210 public safety answering point network
220 public safety answering point user equipment or call agent

Fig. 4

20 mobile communication device 100 packet switched communication system
110 packet access entity or node
120 packet access entity or node
130 P-CSCF entity or node
140 E-CSCF entity or node 200 public safety answering point
210 public safety answering point network
220 public safety answering point user equipment or call agent

Fig. 5

20 mobile communication device 100 packet switched communication system
110 packet access entity or node
120 packet access entity or node
130 P-CSCF entity or node
140 E-CSCF entity or node 200 public safety answering point
210 public safety answering point network
220 public safety answering point user equipment or call agent

INITIATION AND/OR ROUTING OF AN EMERGENCY SESSION IN A PACKET SWITCHED COMMUNICATION SYSTEM

CROSS-REFERENCE TO PRIOR APPLICATIONS

This application is a U.S. National Phase application under 35 U.S.C. § 371 of International Application No. PCT/EP2019/070057, filed on Jul. 25, 2019, and claims benefit to European Patent Application No. EP 18185941.4, filed on Jul. 27, 2018. The International Application was published in English on Jan. 30, 2020 as WO 2020/021017 A1 under PCT Article 21(2).

FIELD

The present invention relates a method for an enhanced initiation and/or routing of an emergency session in a packet switched communication system with a public safety answering point being either a part of the packet switched communication system or being able to be accessed by the packet switched communication system, wherein the emergency session originates from or is initiated by a mobile communication device in or connected to the packet switched communication system.

Furthermore, the present invention relates to a system for an enhanced initiation and/or routing of an emergency session in a packet switched communication system, a public safety answering point being either a part of the packet switched communication system or being able to be accessed by the packet switched communication system, the system comprising a mobile communication device and the packet switched communication system, the emergency session originating from or being initiated by the mobile communication device in or connected to the packet switched communication system.

Also, the present invention relates to a mobile communication device for an enhanced initiation and/or routing of an emergency session in a packet switched communication system, a public safety answering point being either a part of the packet switched communication system or being able to be accessed by the packet switched communication system, the emergency session originating from or being initiated by the mobile communication device in or connected to the packet switched communication system.

Furthermore, the present invention relates to packet switched communication system and/or to a network node or a network entity of a packet switched communication system to be used as part of a system and/or in connection with a mobile communication device.

Additionally, the present invention relates to a program and to a computer-readable medium for an enhanced initiation and/or routing of an emergency session in a packet switched communication system.

BACKGROUND

Today the majority of mobile originated emergency calls is based on Circuit Switched (CS) emergency calls (Teleservice 12) optimized for 2G (GSM) and 3G (UMTS) CS networks. This design enables a person in need of help to place an emergency call, and almost any 2G or 3G connectivity is typically sufficient for such an emergency call to be successfully placed. Such traditional emergency calls are typically routed based on the location or geographical position of the caller, and, hence, the local language is typically used by a public safety answering point in response to the placed emergency call. This design therefore does not satisfactorily cover the needs of persons that do not understand or speak the local language.

The possibility to place an emergency call in case connectivity is available is the highest priority for today's commonly deployed mobile emergency call systems. While the addition of emergency call-related data, like the position of the caller, the time, etc. helps emergency services to organize rescue/support in the most efficient way, the current systems based on CS technology lacks the possibility to automatically indicate specific personal pieces of information of the caller, such as the preferred language of the caller.

The limitations in conventionally known emergency call systems, e.g., to be required to use the local language, often causes problems for quite a number of persons, e.g. persons on the move or on holiday, and in stressful situations like an emergency. Additionally, deaf-mute people are in an even worse situation being able to communicate in only a very limited manner or not at all with the public safety answering point services personal.

SUMMARY

In an exemplary embodiment, the present invention provides a method for an enhanced initiation and/or routing of an emergency session in a packet switched communication system, a public safety answering point being either a part of the packet switched communication system or being able to be accessed by the packet switched communication system, the emergency session originating from or being initiated by a mobile communication device in or connected to the packet switched communication system. The method includes: determining or defining—by the mobile communication device or by means of the mobile communication device—of personal communication ability information and/or personal medical condition information of a user of the mobile communication device; and initiating the emergency session by using the mobile communication device. Initiating the emergency session comprises transmitting an emergency message, via a packet switched connection of the mobile communication device, to the packet switched communication system. The personal communication ability information and/or the personal medical condition information is part of the emergency message. The personal communication ability information comprises at least one out of the following: an indication of a preferred language to be used by the public safety answering point, an indication of a prioritized list of preferred languages or form of communication to be used by the public safety answering point, or an indication of incapability to use a voice call. The personal medical condition information comprises at least one out of the following: an indication of a preferred additional contact person or contact instance to be used or contacted by the public safety answering point, an indication of a prioritized list of preferred additional contact persons or contact instances to be used by the public safety answering point, or an indication of reference information to a medical or personal record of the user of the mobile communication device.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Exemplary embodiments of the present invention enhance the initiation and/or routing of an emergency session (or emergency call) in a packet switched communication system, especially towards a public safety answering point and/or towards a recipient of the emergency session able to provide help or rescue to the user initiating the emergency session (or emergency call) such that: latencies can be reduced and/or resources can be saved and/or more efficient help can be provided to the calling party.

In an exemplary embodiment, the present invention provides a method for an enhanced initiation and/or routing of an emergency session in a packet switched communication system, a public safety answering point being either a part of the packet switched communication system or being able to be accessed by the packet switched communication system, the emergency session originating from or being initiated by a mobile communication device in or connected to the packet switched communication system, the method comprising the steps of:

determining or defining—by the mobile communication device or by means of the mobile communication device—of a personal communication ability information and/or a personal medical condition information of a user of the mobile communication device, and initiating the emergency session by using the mobile communication device, wherein initiating the emergency session comprises transmitting an emergency message, via a packet switched connection of the mobile communication device, to the packet switched communication system, wherein the personal communication ability information and/or the personal medical condition information is part of the emergency message.

It is thereby advantageously possible according to the present invention to improve the handling of a packet switched emergency session or a packet switched emergency call within a packet switched communication system (or packet switched telecommunications network).

In the context of the present invention, the term emergency session is mostly used (instead of the term emergency call) for the situation of a calling party (or an initiating party or user) trying to contact a public safety answering point initiating an emergency procedure based on a packet switched communication system and using a packet switched connection of a mobile communication device towards the packet switched communication system.

According to the present invention, a public safety answering point is typically at least tried to be contacted, by the mobile communication device, by means of initiating the emergency session. Typically such a public safety answering point is either part of the packet switched communication system or, in most cases, the public safety answering point is, strictly speaking, not part of the packet switched communication system, but the packet switched communication system is able access the public safety answering point.

The emergency session according to the present invention originates from (or is initiated by) a mobile communication device which is located in the packet switched communication system or connected to the packet switched communication system. This initiation is typically done by means of dialing an emergency number as defined by local regulation, such as, e.g., "112 or 911" or a call number of a service center/helpdesk.

According to the present invention, a personal communication ability information and/or a personal medical condition information of a user of the mobile communication device is (in a first step) determined or defined by the mobile communication device, typically either input to the mobile communication device (e.g., by the user of the mobile communication device) or searched within the mobile communication device or retrieved or obtained from a source external to the mobile communication device. In the context of the present invention, the term personal communication ability information especially relates to the communication abilities (or lack of such abilities) of a user of the mobile communication device, whereas the term personal medical condition information especially relates to the specific medical condition of the user of the mobile communication device. In this patent application, the terms personal communication ability information and personal medical condition information both relate to at least one piece of personal information related to the user of the mobile communication device. The wording "personal communication ability information and/or personal medical condition information" typically relates to either a (or at least one) piece of information (such as, e.g., a language preference) being a personal communication ability information, or to a (or at least one) piece of information (such as, e.g., an information regarding a specific doctor or instance familiar with the condition of the calling person) being a personal medical condition information, or to both a (or at least one) piece of information being a personal communication ability information, and a (or at least one) piece of information being a personal medical condition information.

Furthermore according to the present invention, an emergency session is initiated (in a second step, during or subsequent to the first step of determining or defining the personal communication ability information and/or the personal medical condition information) by using the mobile communication device. Additionally according to the present invention, initiating the emergency session comprises the transmission (by the mobile communication device) of an emergency message, via a packet switched connection of the mobile communication device, to the packet switched communication system, wherein the personal communication ability information and/or the personal medical condition information is part of that emergency message (i.e. the emergency message comprises the personal communication ability information and/or the personal medical condition information).

According to the present invention, by transmitting the personal communication ability information and/or the personal medical condition information, it is advantageously possible to initiate the emergency session in a more efficient manner, and, especially, it is advantageously possible to provide an enhanced (and especially more efficient) routing of the emergency session to the appropriate (or most helpful) destination, such as a public safety answering point staff member being able to talk in a specific preferred language or an instance being able to provide medical help based, e.g., on previous knowledge or experience with the medical condition of the person initiating the emergency session.

For example, and in case that the personal communication ability information and/or the personal medical condition information corresponds to a preferred language information, the manually pre-set language or the language determined from a query to connected devices (e.g. the entertainment system in the car or similar) is added (e.g. in a specified format like ISO 31661-1) to the XML, body or SIP message header associated with the requested emergency call(s) or emergency session(s). Especially, either the IMS network and/or the EPC network of the local packet switched communication system recognizes that such new information (i.e. the personal communication ability information and/or the personal medical condition information) is added and routes the call (or the emergency session) to a predefined destination and/or the information is forwarded to the recipient.

According to a preferred embodiment of a method, a system, a mobile communication device, a packet switched communication system, a network node or network entity, or a program according to the present invention, the emergency session is an IMS-based (IP multimedia subsystem based) packet switched emergency session and the personal communication ability information and/or the personal medical condition information is
  part of a SIP invite message and/or
  part of a SIP header information of the emergency message and/or
  part of an XML body of the emergency message.

Via the emergency session being IMS-based and the personal communication ability information and/or the personal medical condition information being part of a SIP invite message (session initiation protocol invite message) and/or part of a SIP header information (session initiation protocol header information) of the emergency message and/or part of an XML body of the emergency message, it is advantageously possible according to the present invention to provide an efficient initiation of the emergency message in the packet switched communication system, providing for the transmission of additional pieces of information—at a point in time when the emergency session is initiated—that can later be used to take a more efficient routing decision of that specific emergency session request.

Furthermore according to the present invention, it is preferred that the emergency session especially comprises a voice call or a video call and/or a text chat.

Providing, e.g., the possibility of a text chat as part of the emergency session, makes it possible for deaf-mute persons to be able to communicate with a public safety answering point.

According to a preferred embodiment of a method according to the present invention, the method furthermore comprises the steps of
  evaluating the emergency message by means of a network entity of the packet switched communication system, and
  routing the emergency message to at least a recipient of the public safety answering point in accordance with the evaluated personal communication ability information and/or the evaluated personal medical condition information,
  wherein the method especially comprises the following additional steps:
    analyzing personal communication ability data,
    determining a sequence of communication channels based on the analysis,
    arranging the personal communication ability information in accordance with the determined sequence,
    routing the emergency message based on the determined sequence and availability of corresponding recipients, either in network nodes of the IMS core, especially the P-CSCF node or the E-CSCF node or an application server (AS) node, or in the public safety answering point.

Likewise according to a preferred embodiment of a system, a mobile communication device, a packet switched communication system, a network node or network entity, or a program according to the present invention, the system or its components is/are configured such that:
  the emergency message is evaluated by means of a network entity of the packet switched communication system, and
  the emergency message is routed to at least a recipient of the public safety answering point in accordance with the evaluated personal communication ability information and/or the evaluated personal medical condition information,
  wherein the system or its components is/are configured such that:
    personal communication ability data are analyzed,
    a sequence of communication channels based on the analysis are determined,
    the personal communication ability information being arranged in accordance with the determined sequence, and
    the emergency message being routed based on the determined sequence and availability of corresponding recipients, either in network nodes of the IMS core, especially the P-CSCF node or the E-CSCF node or an AS node, or in the public safety answering point.

Thereby, it is advantageously possible according to the present invention to route the initiated emergency message efficiently and in accordance with the provided additional personal pieces of information of the user of the mobile communication device.

According to a further preferred embodiment of a method according to the present invention, the method furthermore comprises, prior to initiating the emergency session by the mobile communication device, detecting an emergency situation by means of the mobile communication device or a device coupled with the mobile communication device.

Thereby, it is advantageously possible that the emergency situation is able to be detected by the mobile communication device itself (and, accordingly, the emergency session initiated), or that the mobile communication device is triggered by either the user of the mobile communication device or by another external signal or device (e.g. a heart pacemaker), especially coupled with the mobile communication device, such that the emergency session is able to be initiated by the mobile communication device.

According to still a further preferred embodiment of a method, a system, a mobile communication device, a packet switched communication system, a network node or network entity, or a program according to the present invention, the emergency session and/or the emergency message comprises a voice message.

According to still a further preferred embodiment of a method, a system, a mobile communication device, a packet switched communication system, a network node or network entity, or a program according to the present invention, the personal communication ability information comprises at least one out of the following:

the indication of a preferred language to be used by the public safety answering point, the indication of a prioritized list of preferred languages to be used by the public safety answering point, the indication of incapability to use a voice call, wherein the step of determining or defining the personal communication ability information especially comprises the step of:

reading out communication ability data of a memory device of the mobile communication device or a device coupled to the mobile communication device.

Likewise according to still a further preferred embodiment of a method, a system, a mobile communication device, a packet switched communication system, a network node or network entity, or a program according to the present invention, the personal medical condition information comprises at least one out of the following:

the indication of a preferred additional contact person or contact instance to be used or contacted by the public safety answering point, the indication of a prioritized list of preferred additional contact persons or contact instances to be used by the public safety answering point, the indication of a reference information to a medical or personal record of the user of the mobile communication device, wherein the step of determining or defining the personal medical condition information especially comprises the step of:

reading out personal health data of a memory device of the mobile communication device or a device coupled to the mobile communication device.

According to these preferred embodiments of the present invention, it is advantageously possible to provide the possibility to more efficiently route the emergency session through the packet switched communication system, and to find a more appropriate destination for the emergency session to be treated or handled.

According to still a further preferred embodiment of the method, the system, the mobile communication device, the packet switched communication system, the network node or network entity and the program according to the present invention, the public safety answering point comprises at least one out of the following functionalities:

the public safety answering point recipient is an automatic translator, enabling a connection with any public safety answering point, the public safety answering point uses text or voice translation, especially voice-to-text translation, the translation of the public safety answering point is selected based on quality of the translation in the respective language.

Thereby, it is possible to enhance the communication possibilities between the person initiating the emergency session on the one hand, and the public safety answering point (or staff of the public safety answering point) on the other hand. Especially, it is, e.g., advantageously possible to select the translation of the public safety answering point based on the quality of the translation in the respective language (e.g. for a Japanese-speaking person travelling in Germany, available public safety answering point translations include German or English, however, in case that the translation from Japanese to English is better than from Japanese to German, the translation from Japanese to English might be preferred, and, e.g., based on this decision, the corresponding public safety answering point is contacted).

Furthermore, the present invention relates to a system for an enhanced initiation and/or routing of an emergency session in a packet switched communication system, a public safety answering point being either a part of the packet switched communication system or being able to be accessed by the packet switched communication system, the system comprising a mobile communication device and the packet switched communication system, the emergency session originating from or being initiated by the mobile communication device in or connected to the packet switched communication system, wherein the system is configured such that:

a personal communication ability information and/or a personal medical condition information of a user of the mobile communication device is determined or defined by the mobile communication device or by means of the mobile communication device, and the emergency session is initiated by the mobile communication device, wherein the system is furthermore configured such that initiating the emergency session comprises transmitting an emergency message, via a packet switched connection of the mobile communication device, to the packet switched communication system, wherein the personal communication ability information and/or the personal medical condition information is part of the emergency message.

It is advantageously possible, by means of using such a system, to initiate and/or route emergency sessions more efficiently, and thereby potentially reducing the delay for providing help and/or increasing the effectiveness of the help and/or rescue provided.

Furthermore, the present invention relates to a mobile communication device for an enhanced initiation and/or routing of an emergency session in a packet switched communication system, a public safety answering point being either a part of the packet switched communication system or being able to be accessed by the packet switched communication system, the emergency session originating from or being initiated by the mobile communication device in or connected to the packet switched communication system, wherein the mobile communication device is configured such that:

a personal communication ability information and/or a personal medical condition information of a user of the mobile communication device is determined or defined by the mobile communication device or by means of the mobile communication device, and the emergency session is initiated by the mobile communication device, wherein the mobile communication device is furthermore configured such that initiating the emergency session comprises transmitting an emergency message, via a packet switched connection of the mobile communication device, to the packet switched communication system,
wherein the personal communication ability information and/or the personal medical condition information is part of the emergency message.

It is advantageously possible, by means of using such a mobile communication device, to initiate emergency sessions more efficiently, and thereby potentially reducing the delay for providing help and/or increasing the effectiveness of the help and/or rescue provided.

Also, the present invention relates to a packet switched communication system to be used as part of a system in an exemplary embodiment and/or in connection with a mobile communication device in an exemplary embodiment.

Furthermore, the present invention relates to a network node or network entity of a packet switched communication system to be used as part of a system in an exemplary embodiment and/or in connection with a mobile communication device in an exemplary embodiment.

Additionally, the present invention relates to program comprising a computer readable program code which, when executed on a computer or on a mobile communication device or on a network node of a packet switched communication system, or in part on the mobile communication device and/or in part on the network node of the packet switched communication system, causes the computer or the mobile communication device or the network node of the packet switched communication system to perform a method according to the present invention.

Still additionally, the present invention relates to a computer-readable medium comprising instructions which when executed on a computer or on a mobile communication device or on a network node of a packet switched communication system, or in part on the mobile communication device and/or in part on the network node of the packet switched communication system, causes the computer or the mobile communication device or the network node of the packet switched communication system to perform a method according the present invention.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to exemplary embodiments and with reference to certain drawings, but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 1:
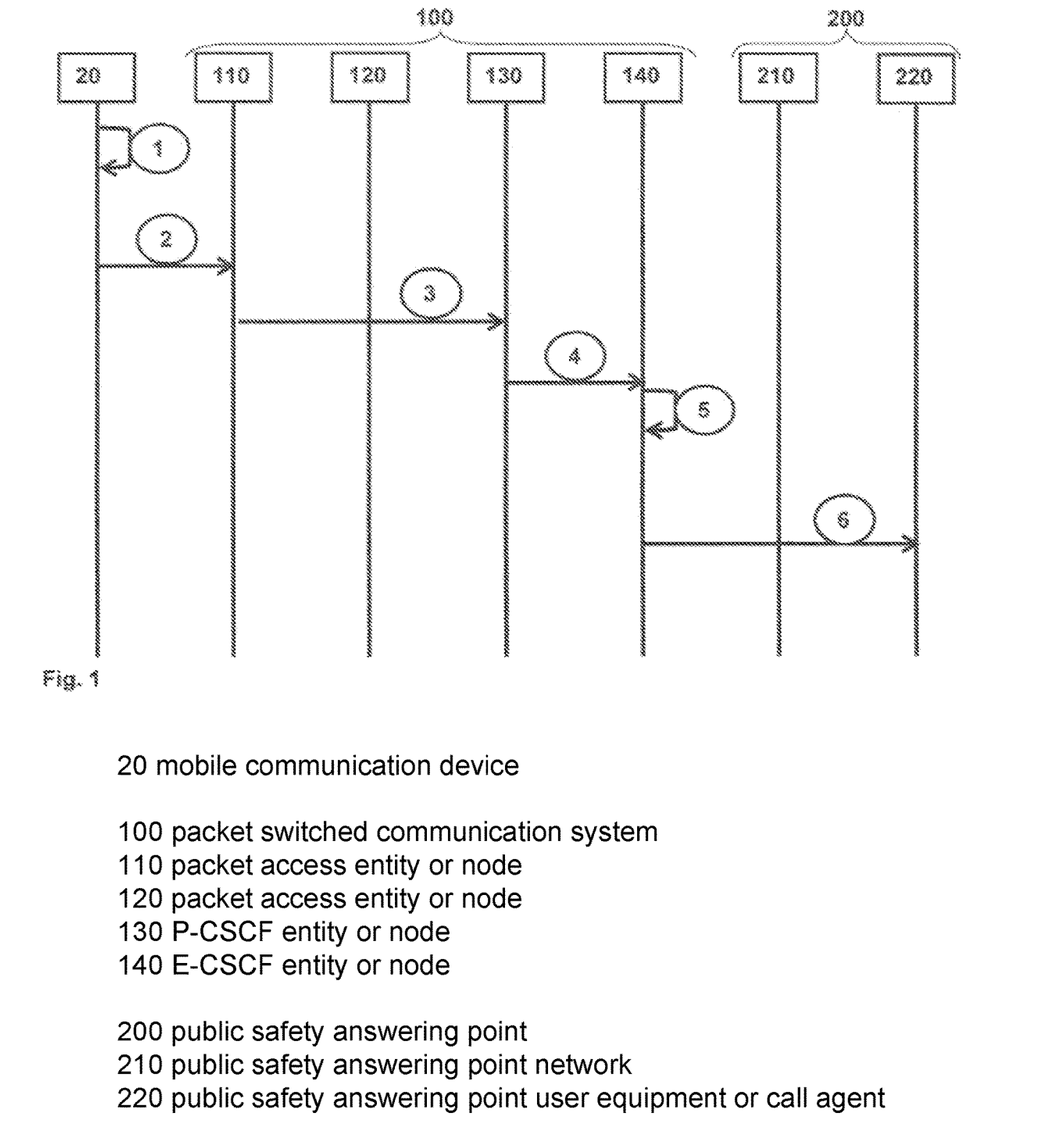
FIG. 1 schematically illustrates a communication diagram of a mobile communication device initiating an emergency session towards a packet switched communication system, showing a first embodiment according to the present invention.

In FIG. 1, a communication diagram of a mobile communication device 20 initiating an emergency session towards a packet switched communication system 100 is schematically shown according to a first embodiment according to the present invention. In FIGS. 2 to 5, likewise a communication diagram of the mobile communication device 20 initiating an emergency session towards the packet switched communication system 100 is schematically shown according to a second, third, fourth, and fifth embodiment, respectively. The communication diagrams of FIGS. 1 to 5 represent communication between at least part of the following entities or nodes or devices: The mobile communication device 20, the packet switched communication system 100, and a public safety answering point 200. The packet switched communication system 100 comprises a packet access (especially according to the LTE and/or 5G and/or WLAN and/or DSL standards), the packet access comprising entities or network nodes represented by reference signs 110 and 120, especially by entity or network node 110. Furthermore, the packet switched communication system 100 comprises (besides the packet access 110, 120) further network nodes, especially a proxy call state control function node (or entity) 130 (or P-call state control function, or P-CSCF) and an emergency call state control function node (or entity) 140 (or E-call state control function node, or E-CSCF). The public safety answering point 200 especially comprises a public safety answering point network 210 and a public safety answering point user equipment 220.

Typically, the packet switched communication system 100 (or telecommunications network) is a mobile (or a fixed line) telecommunications network, comprising typically an access network and a core network. In case of a mobile telecommunications network, the access network of the packet switched communication system 100 typically comprises a plurality of base station entities and the user equipment 20 is able to be connected to the packet switched communication system 100 via typically one of the base station entities.

In a first processing step, designated by reference sign 1 in FIG. 1 as well as in FIGS. 2 to 5, an emergency situation is detected or recognized by the mobile communication device 20.

The mobile communication device 20 is typically a smart phone but the invention is not limited to the mobile communication device 20 actually being a smart phone. Alternatively, the mobile communication device 20 is any communication device, typically also a computing device, and typically a mobile computing and communication device such as, e.g., at least one out of the following: a mobile phone, a personal digital assistant, a mobile computing device such as a tablet device or a phablet device or a laptop computer. The mobile communication device 20 is also able to be installed or otherwise included (permanently or non-permanently) inside a vehicle such as a car or the like.

Alternatively to the mobile communication device 20 detecting the emergency situation (in processing step 1), it is also possible and preferred according to the present invention that the mobile communication device 20 is triggered by a user (or by the user) of the mobile communication device 20 to initiate the emergency session or emergency call. Still alternatively, it is also possible and preferred according to the present invention, that a further device is coupled with or coupled to the mobile communication device 20, which further device provides a signal or command to the mobile communication device 20 such that the mobile communication device 20 initiates the emergency session.

In a second processing step, designated by reference sign 2 in FIG. 1 as well as in FIGS. 2 to 5, an initial message to establish the emergency session is sent from the mobile communication device 20 to the packet access, especially node 110 of the packet access within the packet switched communication system 100. The initial message of processing step 2 especially corresponds to or comprises the SIP invite message or the SIP header information of the emergency message comprising a personal communication ability information and/or a personal medical condition information of a user of the mobile communication device 20. Alternatively, the initial message of processing step 2 especially corresponds to or comprises the XML (extended markup language) body element describing the personal communication ability information and/or the personal medical condition information of the user of the mobile communication device 20. According to the present invention, the initial message (of processing step 2) to establish the emergency session corresponds to the emergency message according to the present invention, and especially the emergency session is an IMS-based (IP multimedia subsystem based) packet switched emergency session.

In a third processing step, designated by reference sign 3 in FIG. 1 as well as in FIGS. 2 to 5, the initial message to establish the emergency session is sent (or routed) from the packet access, especially node 110 of the packet access within the packet switched communication system 100, to the proxy-call state control function node (or entity) 130 of the packet switched communication system 100.

According to the present invention, a method for an enhanced initiation and/or routing of an emergency session in a packet switched communication system 100 is provided. The emergency session originates from or is initiated by the mobile communication device 20 in or connected to the packet switched communication system 100. According to the present invention, in a first step, a personal communication ability information and/or a personal medical condition information of a user of the mobile communication device 20 is determined or defined by the mobile communication device 20 or by means of the mobile communication device 20. In a second step, typically subsequent to the first step, an emergency session is initiated, by using the mobile communication device 20, wherein initiating the emergency session comprises transmitting an emergency message (in processing step 2), via a packet switched connection of the mobile communication device 20, to the packet switched communication system 100 (or to its packet access nodes or entities, typically packet access node 110), and wherein the personal communication ability information and/or the personal medical condition information is part of the emergency message.

In the following, a first, second, third, fourth and fifth embodiment is described for the processing steps after the third processing step 3, based on FIGS. 1 to 5, respectively.

In the first embodiment shown in FIG. 1, in a fourth processing step designated by reference sign 4 in FIG. 1, the initial message to establish the emergency session (or emergency message)—i.e. comprising the personal communication ability information and/or the personal medical condition information as part of a SIP invite message and/or as part of a SIP header information of the emergency message and/or as part of an XML body of the emergency message—is sent from the proxy-call state control function node 130 to the emergency-call state control function 140. In a fifth processing step designated by reference sign 5 in FIG. 1, an evaluation takes place at the emergency-call state control function node 140 and a routing decision is taken to select the corresponding (or most appropriate) public safety answering point 200 or the most appropriate instance of the public safety answering point 200. In a sixth processing step designated by reference sign 6 in FIG. 1, the initial message to establish the emergency session (or emergency message) is sent—by the emergency call state control function node 140—to the chosen public safety answering point user equipment 220 or call agent 220.

Figure 2:
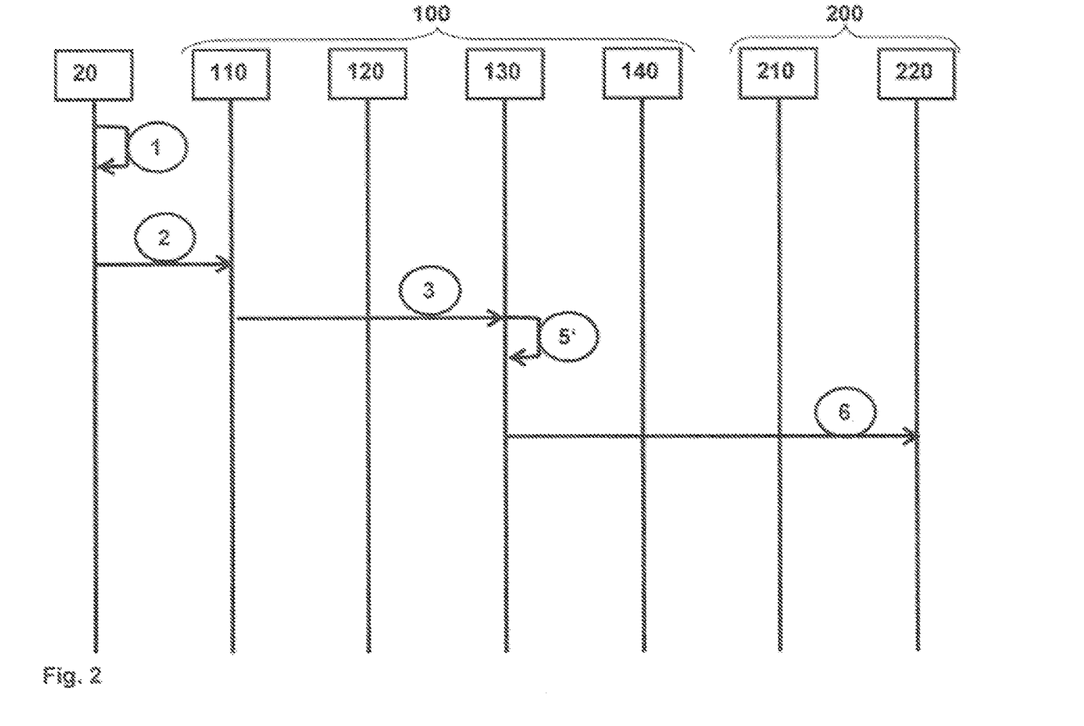
FIG. 2 schematically illustrates a communication diagram of a mobile communication device initiating an emergency session towards a packet switched communication system, showing a second embodiment according to the present invention.

In the second embodiment shown in FIG. 2, instead of the fourth processing step (as according to the first embodiment represented in FIG. 1), a modified fifth processing step, designated by reference sign 5' in FIG. 2, is performed by the proxy-call state control function node 130. The modified fifth processing step 5' corresponds to an evaluation at the proxy-call state control function node 130 and a routing decision taken to select the corresponding (or most appropriate) public safety answering point 200 or the most appropriate instance of the public safety answering point 200. In a sixth processing step designated by reference sign 6 in FIG. 2, the initial message to establish the emergency session (or emergency message) and/or to establish a voice call session is sent—(in contrast to the first embodiment of the present invention) by the proxy-call state control function node 130—to the chosen public safety answering point user equipment 220 or call agent 220.

Figure 3:
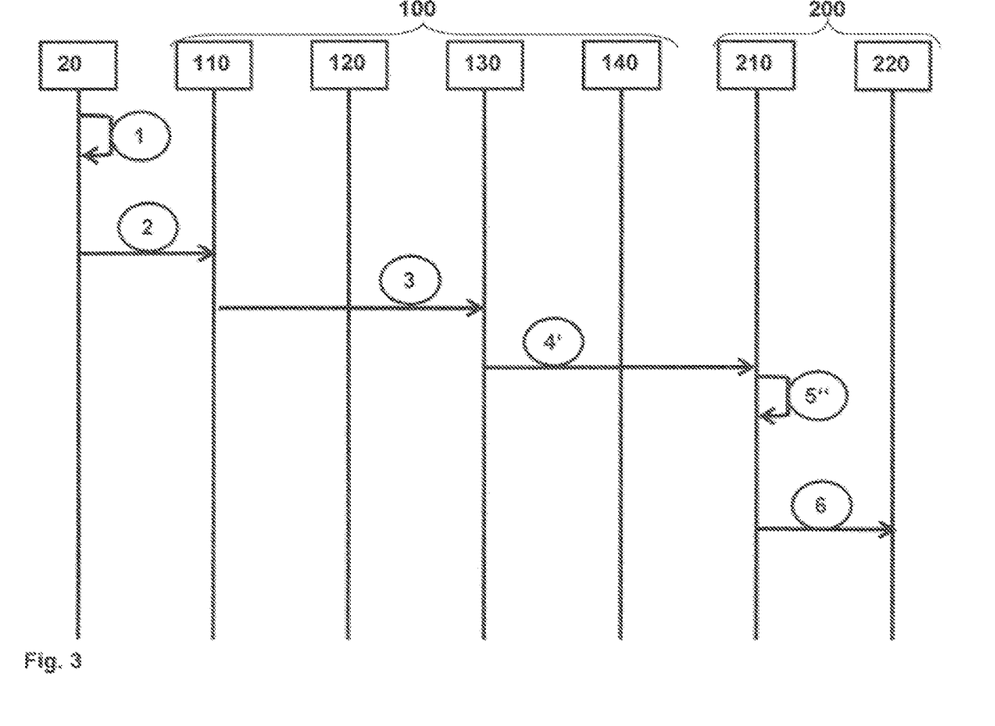
FIG. 3 schematically illustrates a communication diagram of a mobile communication device initiating an emergency session towards a packet switched communication system, showing a third embodiment according to the present invention.

In the third embodiment shown in FIG. 3, in a modified fourth processing step designated by reference sign 4' in FIG. 3, the initial message to establish the emergency session (or emergency message)—i.e. comprising the personal communication ability information and/or the personal medical condition information as part of a SIP invite message and/or as part of a SIP header information of the emergency message and/or as part of an XML body of the emergency message—is sent from the proxy-call state control function node 130 to the public safety answering point network 210 of the public safety answering point 200. In a further modified fifth processing step designated by reference sign 5" in FIG. 3, an evaluation takes place at the public safety answering point network 210 and a routing decision is taken to select the corresponding (or most appropriate) instance (or public safety answering point user equipment 220) of the public safety answering point 200. In a sixth processing step designated by reference sign 6 in FIG. 3, the initial message to establish the emergency session (or emergency message) and/or to establish a voice call session is sent—by the public safety answering point network 220—to the chosen public safety answering point user equipment 220 or call agent 220.

Figure 4:
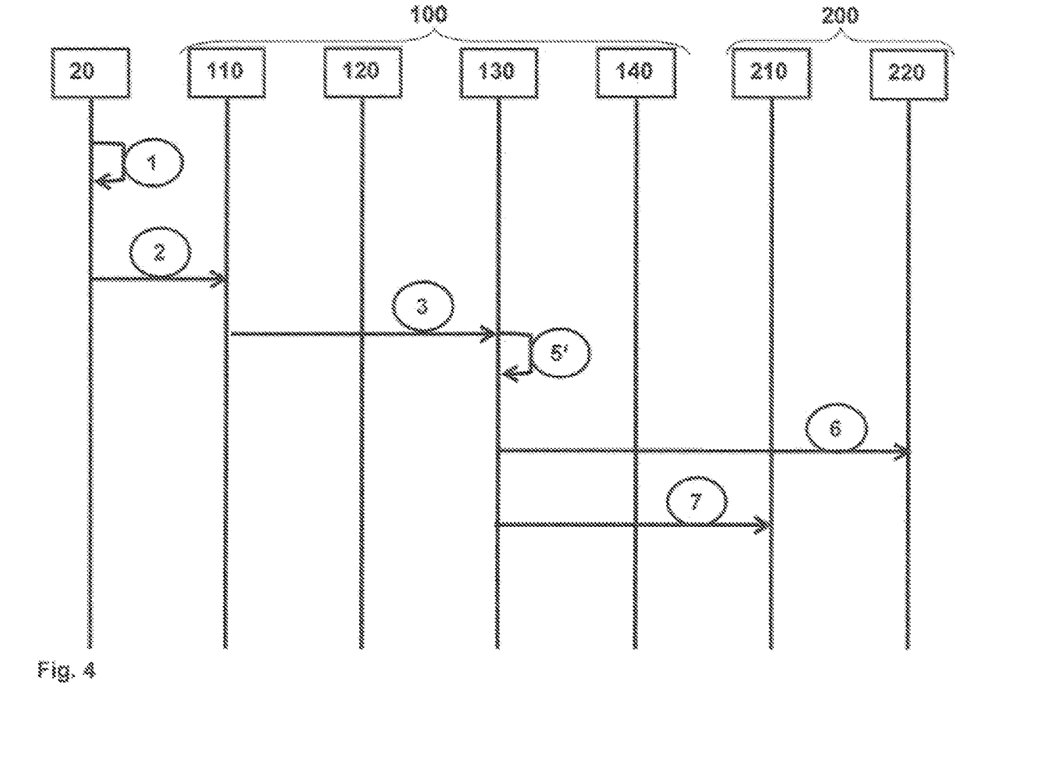
FIG. 4 schematically illustrates a communication diagram of a mobile communication device initiating an emergency session towards a packet switched communication system, showing a fourth embodiment according to the present invention.

In the fourth embodiment shown in FIG. 4, instead of the fourth processing step (as according to the first embodiment represented in FIG. 1), the modified fifth processing step, designated by reference sign 5' in FIGS. 2 and 4, is performed by the proxy-call state control function node 130. The modified fifth processing step 5' corresponds to an evaluation at the proxy-call state control function node 130 and a routing decision taken to select the corresponding (or most appropriate) public safety answering point 200 or the most appropriate instance of the public safety answering point 200. In a sixth processing step designated by reference sign 6 in FIG. 4, the initial message to establish the emergency session (or emergency message) and/or to establish a voice call session is sent—by the proxy-call state control function node 130—to the chosen public safety answering point user equipment 220 or call agent 220. In a seventh processing step designated by reference sign 7 in FIG. 4, the initial message (or emergency message) to establish a parallel voice session call is sent—by the proxy-call state control function node 130—to the public safety answering point network 210 (or to another (or second) public safety answering point user equipment or call agent, which other public safety answering point user equipment or call agent is not specifically represented in FIG. 4 (hence the communication diagram only shows an arrow from the proxy-call state control function node 130 to the public safety answering point network 210).

Figure 5:
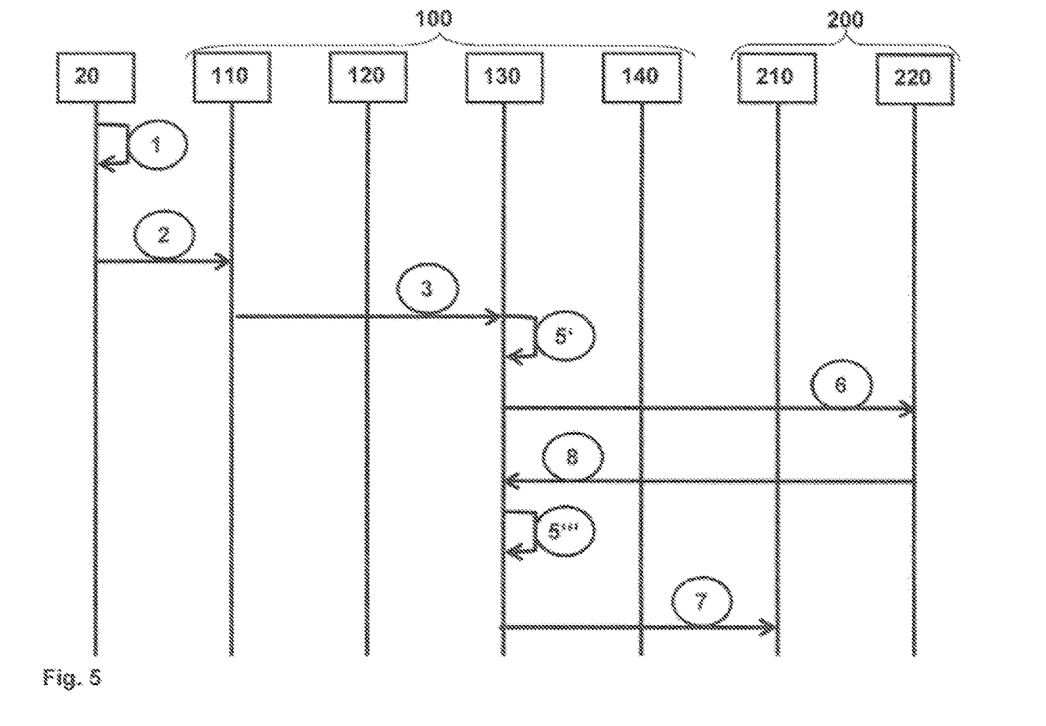
FIG. 5 schematically illustrates a communication diagram of a mobile communication device initiating an emergency session towards a packet switched communication system, showing a fifth embodiment according to the present invention.

In the fifth embodiment shown in FIG. 5, instead of the fourth processing step (as according to the first embodiment represented in FIG. 1), the modified fifth processing step, designated by reference sign 5' in FIGS. 2, 4 and 5, is performed by the proxy-call state control function node 130. The modified fifth processing step 5' corresponds to an evaluation at the proxy-call state control function node 130 and a routing decision taken to select the corresponding (or most appropriate) public safety answering point 200 or the most appropriate instance of the public safety answering point 200. In a sixth processing step designated by reference sign 6 in FIG. 5, the initial message to establish the emergency session (or emergency message) and/or to establish a voice call session is sent—by the proxy-call state control function node 130—to the chosen public safety answering point user equipment 220 or call agent 220. In a subsequent eighth processing step designated by reference sign 8 in FIG. 5, a backward message is transmitted from the public safety answering point user equipment 220 to the proxy-call state control function node 130. In a still further modified fifth processing step designated by reference sign 5''' in FIG. 5, a new (or second) evaluation takes place at the public safety answering point network 210 and a new (or second) routing decision is taken to select the corresponding (or most appropriate) instance (or public safety answering point user equipment 220) of the public safety answering point 200. In a seventh processing step designated by reference sign 7 in FIG. 4, the initial message (or emergency message) to establish a subsequent voice session call is sent—by the proxy-call state control function node 130—to the public safety answering point network 210 (or to another (or second) public safety answering point user equipment or call agent, which other public safety answering point user equipment or call agent is not specifically represented in FIG. 4 (hence the communication diagram only shows an arrow from the proxy-call state control function node 130 to the public safety answering point network 210).

Referring in the following mostly to all embodiments according to the present invention, the present invention defines a design to include an emergency signaling information element (a personal communication ability information and/or a personal medical condition information of a user of the mobile communication device 20) during emergency call establishment (e.g. into the SIP invite message) for PS-based emergency calls (in 4G/WLAN and 5G mobile networks). The information element (i.e. the personal communication ability information and/or the personal medical condition information of a user) according to the present invention indicates user status information like the preferred language of the user initiating the emergency call. The use of this information element is especially useful for the eCall procedure (but not limited to the eCall procedure, i.e. it can also be used for other emergency services using PS networks).
The information transferred (i.e. preferred language, alternative language, family/doctors or alike emergency contact/ limitations in speaking/hearing, environment information) can either be manually configured in the terminal (i.e. in the mobile communication device 20) used beforehand, or derived automatically from other settings or requested from external sources, e.g. for language information, the language setting configured by the operating system of the terminal (or metal chloride solution 20), for example from the settings of the mobile phone operating system like AndroidOS or iOS, or the in-car entertainment system, etc., may be used. The environment information can be derived automatically from the in-build sensors of the device. External sources may be consulted by predefined links (emergency information data base using as key the user identity).

According to the present invention, the routing decision is based on the analysis of the emergency information element (i.e. the personal communication ability information and/or the personal medical condition information of a user), and this information is preferably included either in a SIP header and/or XML, body of a message (e.g. the initial SIP INVITE message and subsequent messages) used in the IMS based PS-emergency call or eCall.

In the packet switched communication system 100, the emergency setup information and the emergency information element (i.e. the personal communication ability information and/or the personal medical condition information of a user)—and if required also network based information—is analyzed (e.g. with Initial Filter Criteria, IFC) and subsequent actions are triggered. These actions typically include applying a specific routing depending on at least one out of the following:

the emergency call type (e.g., police, fire, eCall, etc. . . . ), the called-number and the emergency information element (i.e. the personal communication ability information and/or the personal medical condition information of a user). Thereby, an appropriate Public Safety Answering Point (PSAP) 200 is able to be addressed. It is also possible to forward the available information to the PSAP dispatcher transparently or even enrich the information with network based information like Cell-ID, specific maps, retrieved information (like weather, news, blogs, . . . ).

Other actions include parallel session legs using forking or hunting to different destinations, especially within the public safety answering point 200 or public safety answering point network 210. These sessions are controlled in the packet switched communication system 100; this also allows conferences of different PSAPs, e.g. fire brigades and emergency medical equipment in the ambulance, but also to a nearby hospital or medical specialists.

According to the present invention, the emergency signaling information can be used to update the status of the session initiator in subsequent messages like SIP-Ack or even presence type communication with SIP-Publish/Notify. This may then trigger further actions or simply update information along the session path(s).

The PSAP 200 or any other party being part of the session may also use the emergency setup information in backward direction to e.g. acknowledge to the session initiator the time when help will arrive, to indicate who will arrive to prevent unauthorized help by criminal suspects.

The transferred emergency setup information may be coded in machine readable form (e.g. XML) so that it can be processed automatically, e.g. automatically translated or feed into traffic information system for traffic steering or transferred to news feeds in appropriate form.

The emergency information element (i.e. the personal communication ability information and/or the personal medical condition information of a user) may also contain information added by the user in free format like, the preferred contact person ("please inform my wife/doctor/xyz") or pictures of the trip/vehicle, links to additional medical information, etc.

The emergency signaling information element may also trigger a mode in the networks that changes the behavior to close sessions, as hang-up of one party, especially the initiating user, reconnects even if the connection is lost.

There may be more than one network involved in roaming situations. The emergency signaling element may be used to involve other network control instances in different networks and enable the service, e.g. connect a local emergency station with a bureau to do simultaneous translation (human-assisted or machine-based). The roaming network also may decide to direct the control to a different network control, e.g. the home network or a regional network run by a regional emergency operator like the Red Cross.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for initiation and routing of an emergency session in a packet switched communication system, wherein a public safety answering point is able to be accessed by the packet switched communication system, wherein the emergency session comprises a voice call or a video call, and wherein the method comprises:
   determining or defining, by a mobile communication device in or connected to the packet switched communication system, personal language preference information and/or personal medical condition information of a user of the mobile communication device;
   initiating, by the mobile communication device, the emergency session, wherein initiating the emergency session comprises the mobile communication device transmitting an emergency message, via a packet switched connection of the mobile communication device, to the packet switched communication system, and wherein the personal language preference information and/or the personal medical condition information is part of the emergency message;
   evaluating, by a network entity of the packet switched communication system, the personal language preference information and/or the personal medical condition information of the emergency message;
   selecting, by the network entity of the packet switched communication system, a respective public safety answering point or an instance of a respective public safety answering point in accordance with the evaluated personal language preference information and/or the evaluated personal medical condition information; and
   sending, by the network entity of the packet switched communication system, the emergency message to the selected public answering point or the selected instance to establish the emergency session,
   wherein the personal language preference information comprises at least one out of the following:
      an indication of a preferred language to be used by the public safety answering point during the voice call or the video call, or
      an indication of a prioritized list of preferred languages to be used by the public safety answering point during the voice call or the video call;
   wherein the personal medical condition information comprises at least one out of the following:
      an indication of a preferred additional contact person or contact instance to be used or contacted by the public safety answering point,
      an indication of a prioritized list of preferred additional contact persons or contact instances to be used by the public safety answering point, or
      an indication of reference information to a medical or personal record of the user of the mobile communication device.

2. The method according to claim 1, wherein the emergency session is an IP multimedia subsystem (IMS)-based packet switched emergency session;
   wherein the personal language preference information and/or the personal medical condition information is:
      part of a session initiation protocol (SIP) invite message,
      part of SIP header information of the emergency message, and/or
      part of an extended markup language (XML) body of the emergency message.

3. The method according to claim 1, wherein the method further comprises:
   analyzing personal language preference data,
   determining a sequence of communication channels based on the analysis,
   arranging the personal language preference information in accordance with the determined sequence, and routing the emergency message based on the determined sequence and availability of corresponding recipients, either in network nodes of an IP multimedia subsystem (IMS) core or in the public safety answering point, wherein the network nodes of the IMS core include a P-call state control function (P-CSCF) node, an E-call state control function (E-CSCF) node, and/or an application server (AS) node.

4. The method according to claim 1, wherein the method further comprises:
   prior to initiating the emergency session by the mobile communication device, detecting an emergency situation via the mobile communication device or a device coupled with the mobile communication device.

5. The method according to claim 1, wherein determining or defining the personal language preference information and/or the personal medical condition information of the user of the mobile communication device comprises determining or defining the personal language preference information of the user of the mobile communication device;
wherein determining or defining the personal language preference information of the user of the mobile communication device comprises: reading out language preference data of a memory device of the mobile communication device or a device coupled to the mobile communication device.

6. The method according to claim 1, wherein determining or defining the personal language preference information and/or the personal medical condition information of the user of the mobile communication device comprises determining or defining the personal medical condition information of the user of the mobile communication device;
wherein determining or defining the personal medical condition information of the user of the mobile communication device comprises: reading out personal health data of a memory device of the mobile communication device or a device coupled to the mobile communication device.

7. The method according to claim 1, wherein:
a recipient of the public safety answering point is an automatic translator, enabling a connection with any public safety answering point,
the public safety answering point uses voice-to-text translation, and/or
a translation of the public safety answering point is selected based on a quality of the translation in a respective language.

8. The method according to claim 1, wherein sending the emergency message to the selected public answering point or the selected instance is further based on an emergency call type corresponding to the emergency message.

9. The method according to claim 1, wherein sending the emergency message to the selected public answering point or the selected instance is further based on a called number corresponding to the emergency message.

10. The method according to claim 1, wherein the emergency message is enriched with network-based information prior to being sent to the selected public answering point or the selected instance, wherein the network-based information includes a cell ID.

11. The method according to claim 1, wherein the emergency message is enriched with network-based information prior to being sent to the selected public answering point or the selected instance, wherein the network-based information includes a map.

12. The method according to claim 1, wherein the emergency message is enriched with network-based information prior to being sent to the selected public answering point or the selected instance, wherein the network-based information includes weather information.

13. The method according to claim 1, wherein the emergency message is enriched with network-based information prior to being sent to the selected public answering point or the selected instance, wherein the network-based information includes news information.

14. The method according to claim 1, wherein the emergency message is enriched with network-based information prior to being sent to the selected public answering point or the selected instance, wherein the network-based information includes blog information.

15. The method according to claim 1, further comprising: adding a parallel session leg to the emergency session such that multiple different public safety answering points are conferenced as part of the emergency session.

16. The method according to claim 1, wherein the personal language preference information and/or the personal medical condition information is derived from settings of a mobile operating system of the mobile communication device.

17. The method according to claim 1, wherein the personal language preference information and/or the personal medical condition information is derived from built-in sensors of the mobile communication device.

18. The method according to claim 1, wherein the network entity is part of an IP Multimedia Subsystem (IMS) network and/or an Evolved Packet Core (EPC) network.

19. A system for initiation and routing of an emergency session in a packet switched communication system, wherein the emergency session comprises a voice call or a video call, and wherein the system comprises:
the packet switched communication system, wherein a public safety answering point is able to be accessed by the packet switched communication system; and
a mobile communication device in or connected to the packet switched communication system;
wherein the mobile communication device is configured to:
determine or define personal language preference information and/or personal medical condition information of a user of the mobile communication device; and
initiate the emergency session, wherein initiating the emergency session comprises the mobile communication device transmitting an emergency message, via a packet switched connection of the mobile communication device, to the packet switched communication system, and wherein the personal language preference information and/or the personal medical condition information is part of the emergency message;
wherein a network entity of the packet switched communication system is configured to:
evaluate the personal language preference information and/or the personal medical condition information of the emergency message; and
select a respective public safety answering point or an instance of a respective public safety answering point in accordance with the evaluated personal language preference information and/or the evaluated personal medical condition information; and
send the emergency message to the selected public answering point or the selected instance to establish the emergency session;
wherein the personal language preference information comprises at least one out of the following:
an indication of a preferred language to be used by the public safety answering point during the voice call or the video call, or
an indication of a prioritized list of preferred languages or form of communication to be used by the public safety answering point during the voice call or the video call;
wherein the personal medical condition information comprises at least one out of the following:

an indication of a preferred additional contact person or contact instance to be used or contacted by the public safety answering point, an indication of a prioritized list of preferred additional contact persons or contact instances to be used by the public safety answering point, or an indication of a reference information to a medical or personal record of the user of the mobile communication device.

20. One or more non-transitory computer-readable mediums having processor-executable instructions stored thereon for initiation and routing of an emergency session in a packet switched communication system, wherein a public safety answering point is able to be accessed by the packet switched communication system, wherein the emergency session comprises a voice call or a video call, and wherein the processor-executable instructions, when executed, facilitate:

determining or defining, by a mobile communication device in or connected to the packet switched communication system, personal language preference information and/or personal medical condition information of a user of the mobile communication device; and initiating, by the mobile communication device, the emergency session, wherein initiating the emergency session comprises the mobile communication device transmitting an emergency message, via a packet switched connection of the mobile communication device, to the packet switched communication system, and wherein the personal language preference information and/or the personal medical condition information is part of the emergency message;

evaluating, by a network entity of the packet switched communication system, the personal language preference information and/or the personal medical condition information of the emergency message;

selecting, by the network entity of the packet switched communication system, a respective public safety answering point or an instance of a respective public safety answering point in accordance with the evaluated personal language preference information and/or the evaluated personal medical condition information; and sending, by the network entity of the packet switched communication system, the emergency message to the selected public answering point or the selected instance to establish the emergency session;

wherein the personal language preference information comprises at least one out of the following:

an indication of a preferred language to be used by the public safety answering point during the voice call or the video call, or an indication of a prioritized list of preferred languages to be used by the public safety answering point during the voice call or the video call;

wherein the personal medical condition information comprises at least one out of the following:

an indication of a preferred additional contact person or contact instance to be used or contacted by the public safety answering point, an indication of a prioritized list of preferred additional contact persons or contact instances to be used by the public safety answering point, or an indication of reference information to a medical or personal record of the user of the mobile communication device.

\* \* \* \* \*